US006272319B1

(12) United States Patent
Narusawa

(10) Patent No.: US 6,272,319 B1
(45) Date of Patent: Aug. 7, 2001

(54) RADIO SELECTIVE CALLING RECEIVER

(75) Inventor: Hideki Narusawa, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/228,260

(22) Filed: Jan. 11, 1999

(30) Foreign Application Priority Data

Jan. 14, 1998 (JP) ..... 10-020333

(51) Int. Cl.[7] ..... H04B 7/00

(52) U.S. Cl. ..... 455/38.4; 340/825.17; 340/825.44; 455/31.1

(58) Field of Search ..... 455/38.4, 31.1–31.3, 455/228, 426, 458; 340/825.49, 825.36, 825.17, 825.44, 539, 825.46

(56) References Cited

U.S. PATENT DOCUMENTS

| | | | | |
|---|---|---|---|---|
| 4,477,807 | * | 10/1984 | Nakajima et al. | 340/825.44 |
| 4,872,005 | * | 10/1989 | DeLuca et al. | 340/825.44 |
| 5,185,604 | * | 2/1993 | Nepple et al. | 340/825.44 |
| 5,426,424 | * | 6/1995 | Vanden Heuvel et al. | 340/825.44 |
| 5,552,779 | * | 9/1996 | Gaskill et al. | 340/825.44 |
| 5,654,697 | | 8/1997 | Uchida | 340/5.79 |
| 6,020,828 | * | 2/2000 | Gotou | 340/825.44 |
| 6,069,569 | * | 5/2000 | Narusawa | 340/825.44 |

FOREIGN PATENT DOCUMENTS

| | | |
|---|---|---|
| 195 48 394 A1 | 7/1996 | (DE) . |
| 0 611 070 A2 | 8/1994 | (EP) . |
| 0 762 351 A1 | 3/1997 | (EP) . |
| 0 865 188 A2 | 9/1998 | (EP) . |
| 3-127523 | 5/1991 | (JP) . |
| 4-135235 | 5/1992 | (JP) . |
| 4-326632 | 11/1992 | (JP) . |
| 8-95925 | 4/1996 | (JP) . |
| 8-284152 | 11/1996 | (JP) . |
| 8-294152 | 11/1996 | (JP) . |
| 8-317438 | 11/1996 | (JP) . |
| 8-328809 | 12/1996 | (JP) . |
| 9-55969 | 2/1997 | (JP) . |
| WO 97/16932 | 5/1997 | (WO) . |

* cited by examiner

*Primary Examiner*—Dwayne Bost
*Assistant Examiner*—Sonny Trinh
(74) *Attorney, Agent, or Firm*—Scully, Scott, Murphy & Presser

(57) ABSTRACT

A radio selective calling receiver includes a plurality of notification means, a schedule function section, a storage section, and a timepiece section. Each notification means notifies the reception of a call signal to the receiver. The schedule function section allows to input schedule time zones and icons indicating contents of schedule events in the respective time zones. The storage section stores the schedule time zones and icons, which are input by using the schedule function section, in correspondence with each other. The storage section also stores notification means, of the plurality of notification means, which is selected and set in correspondence with each icon indicating the contents of the schedule. Upon receiving the call signal, the timepiece section identifies an icon indicating the contents of the schedule event in the time zone including the reception time on the basis of the schedule time zones stored in the storage section and the reception time of the call signal, selects a notification means corresponding to the icon from the notification means stored in the storage section, and performs notification by using the selected notification means.

5 Claims, 3 Drawing Sheets

STORAGE SECTION 13

T1

| | SET TIME | ICON |
|---|---|---|
| SET TIME ① | 00 : 00 ~ 06 : 00 | ICON INDICATING SLEEP |
| SET TIME ② | 07 : 00 ~ 09 : 00 | ICON INDICATING MOVEMENT BY TRAIN |
| SET TIME ③ | 12 : 00 ~ 13 : 00 | ICON INDICATING LUNCH |
| SET TIME ④ | 15 : 00 ~ 17 : 00 | ICON INDICATING MEETING |
| SET TIME ⑤ | 19 : 00 ~ 20 : 00 | ICON INDICATING LUNCH |

T2 DEFAULT NOTIFICATION MEANS : SPEAKER

T3

| TYPES OF ICONS | NOTIFICATION MEANS SETTING |
|---|---|
| ICON INDICATING SLEEP | LED |
| ICON INDICATING MOVEMENT BY TRAIN | VIBRATOR MOTOR |
| ICON INDICATING LUNCH | VIBRATOR MOTOR |
| ICON INDICATING MEETING | LED |
| ICON INDICATING MOVEMENT BY CAR | SPEAKER |
| ICON INDICATING DATE | SPEAKER |
| ICON INDICATING THAT USER IS OUT | UNSETTING ( DEFAULT NOTIFICATION MEANS IS SET ) |

F I G. 2

RADIO SELECTIVE CALLING RECEIVER

BACKGROUND OF THE INVENTION

The present invention relates to a radio selective calling receiver and, more particularly, to a radio selective calling receiver that can use a schedule function.

As a conventional radio selective calling receiver, for example, a receiver like the one disclosed in Japanese Patent Laid-Open No. 9-55969 is available. This radio selective calling receiver includes a schedule storage means for storing schedule time zones and notification means corresponding to the time zones. The receiver compares the reception time of a received call signal with the time zones stored in the schedule storage means, and selects a notification means corresponding to the time zone including the reception time from the schedule storage means. The receiver then performs notification by using the selected notification means.

In this case, the user sets schedule time zones and notification means corresponding to the time zones in the schedule storage means in accordance with his/her schedule every time he/she sets it. That is, in the conventional radio selective calling receiver, the user inputs schedule time zones and notification means corresponding to the time zones and stores them in the schedule storage means every time he/she sets his/her schedule.

Recently, in the above radio selective calling receiver, the user inputs schedule data together with icons indicating the contents of the respective schedule data, thereby allowing the user to determine the contents of each schedule data with a quick glimpse at the corresponding icon. In this case, the user must set icons as well as schedule time zones and notification means corresponding to the time zones every time he/she sets his schedule. This operation is troublesome for the user.

SUMMARY OF THE INVENTION

The present invention has been made to solve this problem, and has as its object to provide a radio selective calling receiver that can simplify schedule input operation.

In order to achieve the above object, according to the present invention, there is provided a radio selective calling receiver comprising a plurality of notification means for notifying reception of a call signal to the receiver, schedule means for allowing to input schedule time zones and icons indicating contents of schedule events in the respective time zones, schedule storage means for storing the schedule time zones and icons, which are input by using the schedule means, in correspondence with each other, notification function storage means for storing notification means, of the plurality of notification means, which is selected and set in correspondence with each icon indicating the contents of the schedule, and notification control means for, when receiving the call signal, identifying an icon indicating the contents of the schedule event in the time zone including the reception time on the basis of the schedule time zones stored in the schedule storage means and the reception time of the call signal, selecting a notification means corresponding to the icon from the notification means stored in the notification function storage means, and performing notification by using the selected notification means.

BRIEF DESCRIPTION OF THE DRAWINGS

FIG. 2 is a view showing examples of data stored in tables T1, T2, and T3 in the storage section of this radio selective calling receiver.

DESCRIPTION OF THE PREFERRED EMBODIMENT

An embodiment of the present invention will be described next.

Figure 1:
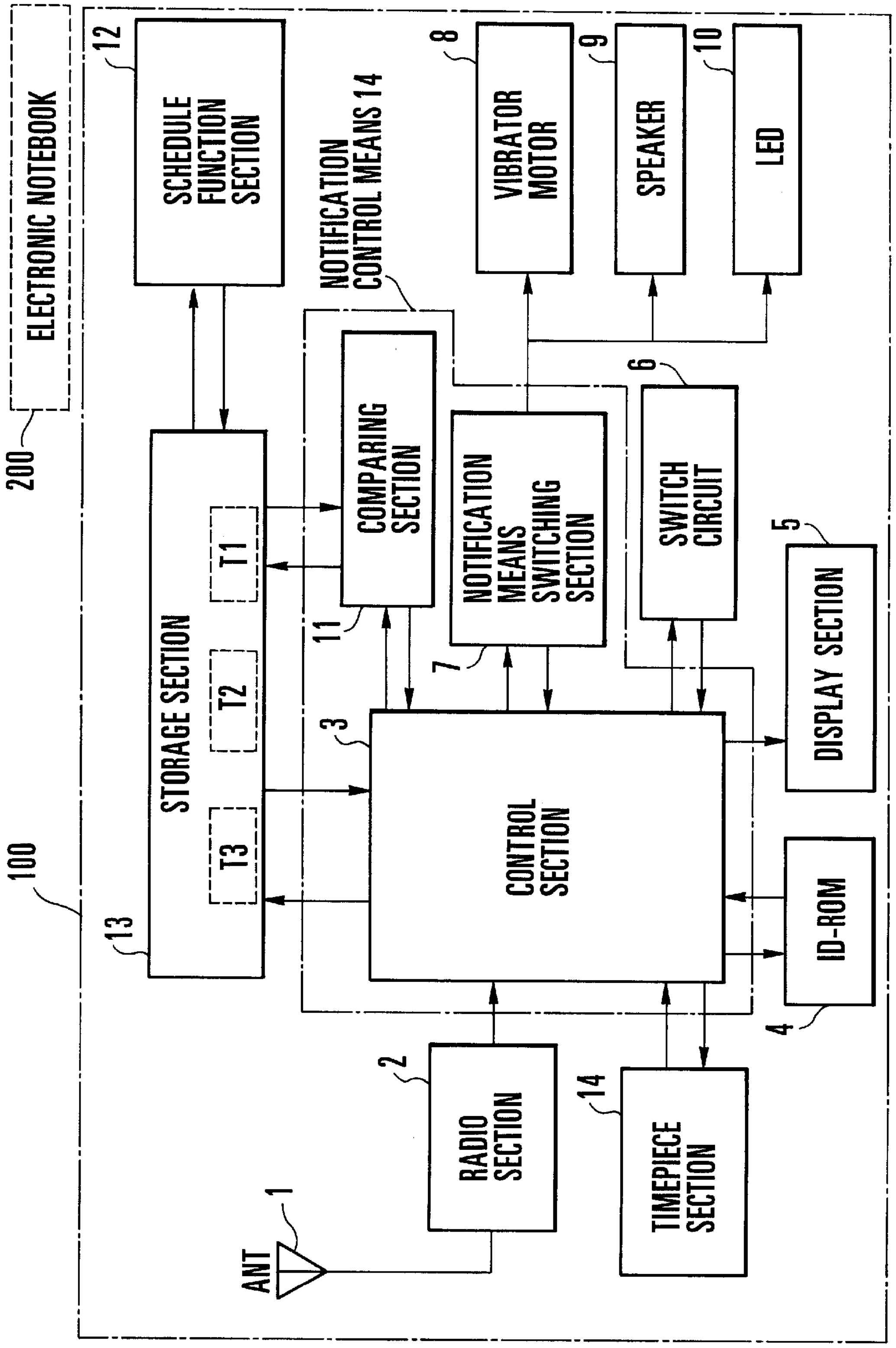
FIG. 1 is a block diagram showing a radio selective calling receiver according to an embodiment of the present invention.

FIG. 1 shows a radio selective calling receiver according to an embodiment of the present invention.

A radio selective calling receiver 100 is comprised of an antenna 1, a radio section 2, a control section 3, a nonvolatile memory (ID-ROM) 4, a display section 5, a switch circuit 6, a notification means switching section 7, a vibrator motor 8, a speaker 9, a light-emitting diode (LED) 10, a comparing section 11, a schedule function section 12, a storage section 13, a timepiece section 14, and the like.

The antenna 1 is used to receive radio signals. The radio section 2 is a circuit for modulating the radio signal received by the antenna 1. The control section 3 is, for example, a microcomputer for storing reception times and controlling the respective components of the radio selective calling receiver 100. The ID-ROM 4 is a memory storing the selective call number of this receiver.

The display section 5 is a display circuit for displaying a message and time. The switch circuit 6 is a circuit for sounding reset, display ON/OFF, time correction, a read of a stored message, and the like.

The notification means switching section 7 is a circuit for selecting one of the following notification means: the vibrator motor 8, the speaker 9, and the LED 10. The vibrator motor 8 is a notification means (mechanical vibration notification means) for performing notification by means of vibrations. The speaker 9 is a notification means (sounding notification means) for performing notification by means of sounds. The LED 10 is a notification means (optical notification means) for performing notification by means of light.

The schedule function section 12 is a circuit block for allowing the user to input schedule data. The storage section 13 is a memory circuit for storing schedule time zones and icons indicating the contents of the schedule events corresponding to the respective time zones, which are input as schedule data, in a table T1; default notification means (to be described later), in a table T2; and notification means selected/set in correspondence with the icons indicating the contents of the respective schedule events, in a table T3. The comparing section 11 is a circuit for comparing the reception time of a call signal with the time zones stored in the table T1. The timepiece section 14 is a circuit for generating real time data. The control section 3, the notification means switching section 7, and the comparing section 11 constitute the timepiece section 14.

Note that the schedule function section 12 may be incorporated in the radio selective calling receiver 100 or in an externally connected electronic notebook 200 or the like.

Of the schedule data input from the schedule function section 12, only the time zones accompanying icons are stored in the table T1 of the storage section 13, together with the icons.

In addition, the notification means selected and set in advance from a plurality of notification means (8, 9, 10) are stored in the table T3 of the storage section 13 in correspondence with the respective icons indicating the contents of the schedule.

FIG. 2 shows examples of data stored in the tables T1, T2, and T3 of the storage section 13. In this case, schedule time zones and icons indicating the contents of schedule events corresponding to the respective time zones are stored in the table T1. In set time ①, an icon indicating a sleep is stored in correspondence with a schedule time zone "00:00–06;00". In set time ②, an icon indicting movement by train is stored in correspondence with a schedule time zone "07:00–09:00". In set time ③, an icon indicating a lunch is stored in correspondence with a schedule time zone "12:00–13:00". In set time ④, an icon indicating a meeting is stored in correspondence with a schedule time zone "15:00–17:00". In set time ⑤, an icon indicating a sleep is stored in correspondence with a schedule time zone "19:00–20:00".

The speaker 9 as the above default notification means is stored in the table T2. This default notification means is set in advance as default data in correspondence with an icon for which no notification means has been set. That is, the speaker 9 as this default notification means is always assigned to an icon for which no notification means has been set by the user.

In the table T3, the LED 10 is stored in correspondence with the icon indicating a sleep, and the vibrator motor 8 is stored in correspondence with the icon indicating movement by train. In addition, the vibrator motor 8 is stored in correspondence with the icon indicating a lunch, and the LED 10 is stored in correspondence with the icon indicating a meeting. Furthermore, the speaker 9 is stored in correspondence with the icon indicating movement by car and the icon indicating a date. Note that no notification means is set for the icon indicating that the user is out. In this case, the default notification means is assigned, as described above. These notification means corresponding to the respective icons are set in advance in the table T3 except for the default notification means.

The operation of this embodiment will be described next.

The radio signal received by the antenna 1 is demodulated by the radio section 2. The control section 3 compares the self-selective call number stored in the ID-ROM 4 with the selective call number contained in this demodulated data. If they coincide with each other, the time at which the radio signal (call signal) is received is stored in the control section 3.

The comparing section 11 reads out the reception time stored in the control section 3, and determines a specific time zone, stored in the table T1 of the storage section 13, to which the reception time corresponds. The control section 3 reads out an icon corresponding to the time zone determined by the comparing section 11 from the table T1, and selects a notification means corresponding to this icon from the table T3.

The control section 3 sends a notification means selection signal indicating the selected notification means to the notification means switching section 7. The notification means switching section 7 notifies the user of the reception of the call by using the vibrator motor 8, the speaker 9, or the LED 10 which is the notification means corresponding to the received notification means selection signal. At this time, if a message is contained in the received radio signal, the message is displayed on the display section 5.

Note that if the radio selective calling receiver 100 has an electronic notebook function, the schedule function section 12 is a function incorporated in the radio selective calling receiver 100. If the radio selective calling receiver 100 can be connected to the electronic notebook 200, and the schedule function is implemented upon this connection, the schedule function section 12 is a function incorporated in the electronic notebook.

If the schedule function section 12 is incorporated in the radio selective calling receiver 100, it suffices if the user only sets schedule time zones by using the schedule function section 12, and operates icons indicating the contents of the schedule. Since the notification means in the set time zones are stored in advance in the table T3 of the storage section 13 in correspondence with the icons, they need not be input.

If the schedule function section 12 is incorporated in the electronic notebook 200, when the radio selective calling receiver 100 is connected to the electronic notebook 200, the schedule time zones and the icons indicating the contents of the schedule which are set by the schedule function section 12 are read out from the electronic notebook 200 and stored in the table T1 of the storage section 13. In this case as well, since the notification means in the set time zones are stored in advance in the table T3 of the storage section 13 in correspondence with the icons, they need not be input.

Icons and notification means, except for the default notification means, can be set in the table T3 by using the switch circuit 6. More specifically, the user selects/determines notification means corresponding to the respective icons by using the switch circuit 6 while checking the icons set by the schedule function section 12 and displayed by the control section 3 on the display section 5. The control section 3 stores the selected/determined notification means in the table T3 of the storage section 13 in correspondence with the respective icons.

Figure 3:
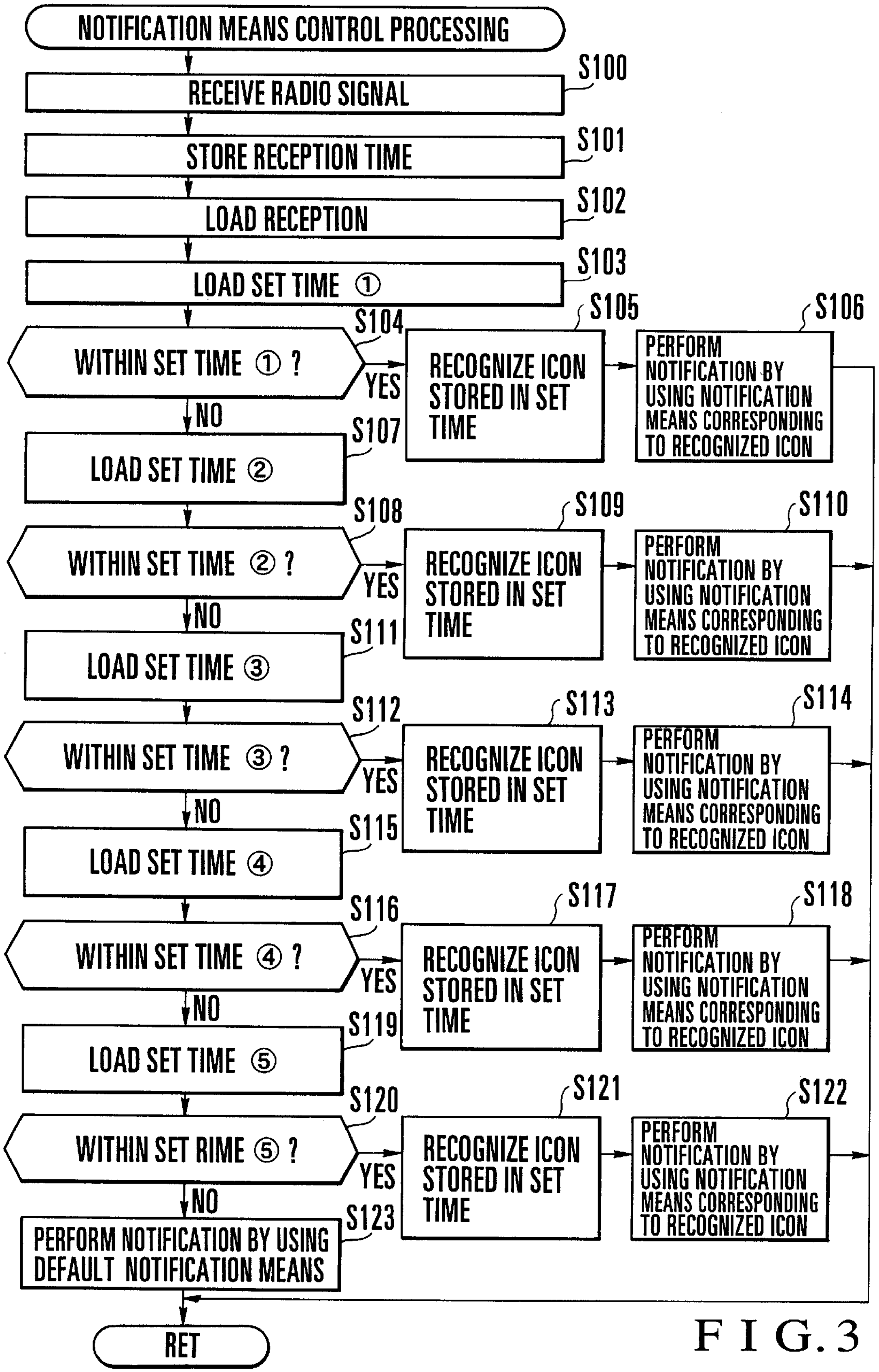
FIG. 3 is a flow chart showing notification means control processing in this radio selective calling receiver.

FIG. 3 shows notification means control processing in the radio selective calling receiver 100. The operation of the radio selective calling receiver 100 will be described below with reference to FIG. 3.

Upon reception of a radio signal containing the self-radio selective call number (step S100), the control section 3 stores the reception time (step S101). The control section 3 then loads the stored reception time (step S102) and set time ① (step S103), and checks whether the reception time falls within set time ① (step S104). If the reception time falls within set time ①, the control section 3 recognizes the icon corresponding to set time ① in the table T1, i.e., the icon indicating a sleep (step S105). The control section 3 controls the notification means switching section 7 in accordance with this recognition result to perform notification by using the LED 10 as the notification means set in the table T3 in correspondence with the icon indicating a sleep (step S106).

If it is determined in step S104 that the reception time falls outside set time ①, the control section 3 loads set time ② (step S107), and checks whether the reception time falls within set time ② (step S108). If the reception time falls within set time ②, the control section 3 recognizes the icon corresponding to set time ② in the table T1, i.e., the icon indicating movement by train (step S109). The control section 3 also controls the notification means switching section 7 in accordance with this recognition result to perform notification by using the vibrator motor 8 as the notification means set in the table T3 in correspondence with the icon indicating movement by train (step S110).

It is determined in step S108 that the reception time falls outside set time ②, the control section 3 loads set time ③ (step S111), and checks whether the reception time falls within set time ③ (step S112). If the reception time falls within set time ③, the control section 3 recognizes the icon corresponding to set time ③ in the table T1, i.e., the icon indicating a meal (step S113). The control section 3 controls the notification means switching section 7 in accordance with this recognition result to perform notification by using the speaker 9 as the notification means set in the table T3 in correspondence with the icon indicating a lunch. (step S114).

If it is determined in step S112 that the reception time falls outside set time ③, the control section 3 loads set time ④

(step S115), and checks whether the reception time falls within set time ④ (step S116). If the reception time falls within set time ④, the control section 3 recognizes the icon corresponding to set time ④ in the table T1, i.e., the icon indicating a meeting (step S117). The control section 3 controls the notification means switching section 7 to perform notification by using the LED 10 as the notification means set in the table T3 in correspondence with the icon indicating a meeting (step S118).

If it is determined in step S116 that the reception time falls outside set time ④, the control section 3 loads set time ⑤ (step S119), and checks whether the reception time falls within set time ⑤ (step S120). If the reception time falls within set time ⑤, the control section 3 recognizes the icon corresponding to set time ⑤ in the table T1, i.e., the icon indicating a lunch (step S121). The control section 3 controls the notification means switching section 7 in accordance with this recognition result to perform notification by using the vibrator motor 8 as the notification means set in the table T3 in correspondence with the icon indicating a meeting (step S122).

If it is determined in step S120 that the reception time falls outside ⑤, the control section 3 performs notification by using the default notification means in the table T2, i.e., the speaker 9 (step S123).

As described above, according to this embodiment, the vibrator motor 8, the speaker 9, the LED 10, or the like is set a s a notification means in correspondence with each icon indicating the contents of a schedule, and the icons and the notification means set in correspondence with the respective icons are stored in the storage section 13 in advance. With respect to an icon for which no notification means is set, the speaker 9 as the default notification means is automatically effected. In inputting schedule data, for example, the user selects schedule time zones and icons corresponding to the contents of the schedule. To perform notification by using a notification means, the control section 3 identifies the notification means set in advance in correspondence with each icon on the basis of the reception time of a radio signal containing the self-radio selective call number, the current time, the schedule event set in the time zone including the current time, and the icon indicating the contents of the schedule event selected when the schedule event is set in this time zone. The control section 3 then performs notification by using this identified notification means. With this operation, the user need not set any notification means in schedule input operation. This simplifies the schedule input operation performed by the user.

According to this radio selective calling receiver, notification means corresponding to the contents of a schedule can be controlled easily and automatically. In addition, the user can recognize the reception of a call more reliably even during a quiet meeting or in a place with large noise in the process of movement without annoying anyone. Furthermore, notification means are automatically set by only operating icons indicating the contents of a schedule, thereby omitting notification means setting operation. This can eliminate trouble to the user in setting notification means, and allows more reliable recognition of the reception of a call by means of an automatically set notification means.

In the embodiment described above, the three types of notification means, i.e., the vibrator motor 8, the speaker 9, and the LED 10, have been exemplified as notification means. However, the types of notification means are not limited to these three types.

As has been described above, according to the present invention, upon reception of a call signal, an icon indicating the contents of a schedule event in a time zone including the reception time is read out from the schedule storage means, and a notification means corresponding to this icon is selected from the notification means stored in the notification function storage means. Notification is then performed by using the selected notification means. In inputting schedule data, therefore, the user may only input schedule time zones and icons indicating the contents of schedule events in the respective time zones. The user need not set any notification means in schedule input operation. This simplifies the schedule input operation performed by the user.

What is claimed is:

1. A radio selective calling receiver comprising:

a plurality of notification means for notifying reception of a call signal to said receiver;

schedule means for allowing to input schedule time zones and icons indicating contents of schedule events in the respective time zones;

schedule storage means for storing the schedule time zones and icons, which are input by using said schedule means, in correspondence with each other;

notification function storage means for storing notification means, of said plurality of notification means, which is selected and set in correspondence with each icon indicating the contents of the schedule; and notification control means for, when receiving the call signal, identifying an icon indicating the contents of the schedule event in the time zone including the reception time on the basis of the schedule time zones stored in said schedule storage means and the reception time of the call signal, selecting a notification means corresponding to the icon from the notification means stored in said notification function storage means, and performing notification by using said selected notification means.

2. A receiver according to claim 1, wherein said schedule means is arranged in an externally connected electronic notebook.

3. A receiver according to claim 1, wherein said notification function storage means stores notification means, set by a switch circuit, in correspondence with each icon set by said schedule means and displayed on a display section.

4. A receiver according to claim 1, wherein said receiver further comprises default notification storage means for storing assigning predetermined notification means, of said plurality of notification means, to an icon for which none of said notification means is selected/set in said notification function storage means and storing the assigned notification means, and said notification control means selects said predetermined notification means stored in said default notification storage means and performs notification by using said selected notification means when no notification means corresponding to the icon indicating the contents of the schedule event in the time zone including the reception time of the call signal is stored in said notification function storage means.

5. A receiver according to claim 1, wherein said notification means comprises any one of a mechanical vibration notification means for performing notification by means of mechanical vibrations, sound notification means for performing notification by means of sounds, and optical notification means for performing notification by means of light.

* * * * *